US012570279B2

(12) United States Patent　　(10) Patent No.:　US 12,570,279 B2
Wallin et al.　　　　　　　　　　(45) Date of Patent:　　Mar. 10, 2026

(54) METHOD OF ASSISTING A DRIVER OF A VEHICLE, AND A DRIVER ASSISTANCE SYSTEM THEREOF

(71) Applicant: Aptiv Technologies AG, Schaffhausen (CH)

(72) Inventors: Patrik Wallin, Gothenburg (SE); Viktor Svensson, Mölndal (SE)

(73) Assignee: Aptiv Technologies AG, Schaffhausen (CH)

( * ) Notice: Subject to any disclaimer, the term of this patent is extended or adjusted under 35 U.S.C. 154(b) by 69 days.

(21) Appl. No.: 18/592,951

(22) Filed: Mar. 1, 2024

(65) Prior Publication Data

US 2024/0300483 A1　　Sep. 12, 2024

(30) Foreign Application Priority Data

Mar. 6, 2023　　(EP) ..................................... 23160269

(51) Int. Cl.
*B60W 30/09*　　　(2012.01)
*G06T 7/20*　　　　(2017.01)
*G06T 7/70*　　　　(2017.01)

(52) U.S. Cl.
CPC .............. *B60W 30/09* (2013.01); *G06T 7/20* (2013.01); *G06T 7/70* (2017.01); *B60W 2420/403* (2013.01); *B60W 2540/225* (2020.02); *B60W 2554/80* (2020.02); *B60W 2754/10* (2020.02); *G06T 2207/10028* (2013.01); *G06T 2207/30268* (2013.01)

(58) Field of Classification Search
CPC ...... G06V 20/597; G06V 20/58; G06V 40/18; G06T 7/20; G06T 7/70; G06T 2207/30268; G06T 2207/10028; B60W 30/0956; B60W 30/09; B60W 2040/0818; B60W 2540/225; B60W 2540/229; B60W 2420/403; B60W 2754/10
See application file for complete search history.

(56) References Cited

U.S. PATENT DOCUMENTS 10,023,204 B1　　7/2018　Kim
11,789,456 B2 *　10/2023　Tan ........................ G06N 3/045
　　　　　　　　　　　　　　　　　　701/23

(Continued)

FOREIGN PATENT DOCUMENTS

EP　　　　　1484014 A1　　12/2004
EP　　　　　3929047 A1　　12/2021

OTHER PUBLICATIONS

Extended European Search Report for EP App. No. 23160269.9, 8 pages Sep. 8, 2023.

*Primary Examiner* — Hai H Huynh
*Assistant Examiner* — Johnny H Hoang
(74) *Attorney, Agent, or Firm* — Miller Johnson

(57) ABSTRACT

A computer-implemented method for assisting a driver of a vehicle includes determining, based on a gaze direction of the driver, a field of view of the driver. The method includes detecting, using an object tracking system, that one or more objects are present around the vehicle. The method includes determining that one or more of the detected objects are outside of the field of view of the driver. The method includes performing an action in response to it being determined that one or more objects are outside of the field of view of the driver.

15 Claims, 5 Drawing Sheets

(56)                  References Cited

U.S. PATENT DOCUMENTS

| | | | |
|---|---|---|---|
| 2014/0139655 A1* | 5/2014 | Mimar | G08B 21/0476 |
| | | | 340/575 |
| 2019/0019413 A1* | 1/2019 | Yun | B60W 60/0053 |
| 2020/0001883 A1 | 1/2020 | Jung | |
| 2020/0391591 A1 | 12/2020 | Kim | |
| 2021/0181837 A1* | 6/2021 | Jiang | G06F 3/013 |
| 2021/0182625 A1* | 6/2021 | Arar | G06F 18/2193 |
| 2022/0121867 A1 | 4/2022 | Arar | |
| 2022/0155093 A1* | 5/2022 | Fear | G01C 21/3679 |
| 2023/0025540 A1 | 1/2023 | Zhang | |
| 2023/0206488 A1* | 6/2023 | Puri | G06F 3/013 |
| | | | 382/100 |

* cited by examiner

METHOD OF ASSISTING A DRIVER OF A VEHICLE, AND A DRIVER ASSISTANCE SYSTEM THEREOF

CROSS-REFERENCE TO RELATED APPLICATIONS

This application claims priority to EP 23 160 269 filed Mar. 6, 2023 filed, the entire disclosure of which is incorporated by reference.

FIELD

The present disclosure relates to a computer-implemented method, a computer program, and a system for assisting a driver of a vehicle.

BACKGROUND

Vehicles (cars, ships, robots etc.) nowadays are typically provided with a vehicle assistance system (such as a Advanced Driving Assistance System (ADAS)) which provides some degree of driving assistance to the driver.

Alongside such assistance systems, driver monitoring systems have long been implemented to try to improve such assistance. For instance, if it is possible to determine the awareness of the driver, the assistance system can be adapted accordingly to provide better assistance. For example, in an Automatic Emergency Brake (AEB) function, if it is possible to detect that the driver is actively engaging in the driving task, it is assumed that the driver is paying attention to the surroundings. In such a situation, in order to avoid false triggers, the assistance system may avoid triggering a collision warning or emergency brake activation later than if the driver was not active. This will avoid unnecessary and false triggers provided to the driver.

If it is detected that the driver is not active, the warning or braking system can be engaged earlier in dangerous situations, thereby mitigating or potentially avoiding otherwise imminent collisions.

The monitoring of driver awareness is analyzed using driver input on the vehicle (e.g., input on the accelerator/brake pedal, steering wheel movement, turn indicator activation etc.). With this, one can build a model of driver awareness based on the driver input for these signals.

Therefore, there is a need to provide a method and system for improving assistance systems by determining the awareness of the driver.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Aspects of the present disclosure are set out in the accompanying independent and dependent claims. Combinations of features from the dependent claims may be combined with features of the independent claims as appropriate and not merely as explicitly set out in the claims.

In an aspect, the present invention concerns a computer-implemented method for assisting the driver of a vehicle. This is achieved by determining, based on a gaze direction of the driver, a field of view of the driver; detecting, using an object tracking system, that one or more objects are present around the vehicle; determining that one or more of the detected objects are outside of the field of view of the driver; and performing an action if it is determined that one or more objects are outside of the field of view of the driver.

By determining the presence of objects around the vehicle, and the information about the driver's gaze, it is possible to determine if a driver is aware of an object using both information. This provides improved driver assistance by providing accurate, true positives and removing false positives.

In a further aspect, performing the action comprises providing an alert and/or providing a compensation measure based on a predetermined condition.

By providing alerts or compensation measures, it is possible to mitigate or potentially avoid otherwise dangerous situations. Additionally, it is also possible to delay the provision of compensation measures to avoid false positives.

In the further aspect, the method may further comprise determining that one or more of the detected objects are at least partly inside the field of view of the driver; and assigning a detection value for each of the detected objects determined to be at least partly inside the field of view of the driver, and storing the detection value of each of the detected object.

By providing a detection value, it is possible to properly classify if the objects were either in (or partly in) the field of view or outside and properly track them.

In a further aspect, the detection value is based on at least one of: a position of the detected object in relation to the vehicle, and the position of the detected object within the field of view of the driver.

From the above aspect, it is possible to classify different objects based on their position, for instance if it is in the direct or peripheral view of the driver, partly or fully in view.

In the further aspect, the method may further comprise, retrieving the detected value of each of the detected object, determining the field of view based on the gaze direction of the driver, and that one or more objects are present around the vehicle, determining that a detected object outside the field of view was previously detected as being within the field of view, and adjusting the detection value for each of the determined objects.

By retrieving and determining, it is possible to use the previous information on the object and adjust it if needed. This ensures that the action is taken based on recent information.

In a further aspect, the predetermined condition is based on at least one of: the position of a detected object in relation to the vehicle, the detection value of a detected object is less than a threshold value, a change in the position of a detected object compared to its previous position, and a rate of change in the position of a detected object compared to its previous positions.

It ensures that the action is taken based on conditions that use recent information for assessment, thus avoiding false positives.

In a further aspect, performing the action comprises adapting a trigger condition for activating an Automatic Emergency Breaking, AEB, system, based on the detection value of a detected object.

Therefore, it is possible to assist the driver by providing compensation measures based on recently calculated values.

In a further aspect, the gaze direction of the driver is detected based on an image of the driver captured by a driver monitoring camera. This makes it possible to properly image the driver.

In a further aspect, the detecting the gaze direction comprises at least one of determining the orientation of the head of the driver, and/or determining the position of the iris of at least one of the eyes of the driver. This makes it possible to accurately determine the gaze of the driver.

In a further aspect, the field of view of the driver is obtained based on one or more parameters of: the gaze direction of the driver, a presence of one of side view mirror, or a rear view mirror, or a display screen in the gaze direction, and environmental conditions.

This makes it possible to properly obtain the field of view based on if the gaze of the driver is on a side view or rear view mirror or a display screen, and the environmental conditions.

In a further aspect, the object tracking system comprises at least one of: radar, LiDAR and camera, positioned at predetermined positions on the vehicle to enable detecting the presence of one or more objects around the vehicle.

This makes it possible to detect the objects around the vehicle properly.

Another aspect of the invention is directed to a driver assistance system for a vehicle, the driver assistance system being adapted to perform the above presented method.

In another aspect, the driver assistance system further comprising a driver monitoring camera, to capture the image of the driver, and/or an object tracking system for detecting the presence of one or more objects around the vehicle.

Another aspect of the invention is directed to a computer program comprising instructions, which when executed by a computer, causing the computer to perform the above described method.

Another aspect of the invention is directed to a vehicle comprising the driver assistance system as described above.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Various aspects of the present invention are described in more detail in the following by reference to the accompanying figures without the present invention being limited to the embodiments of these figures.

In the drawings, reference numbers may be reused to identify similar and/or identical elements.

DETAILED DESCRIPTION

Introduction

Figures 1, 2:
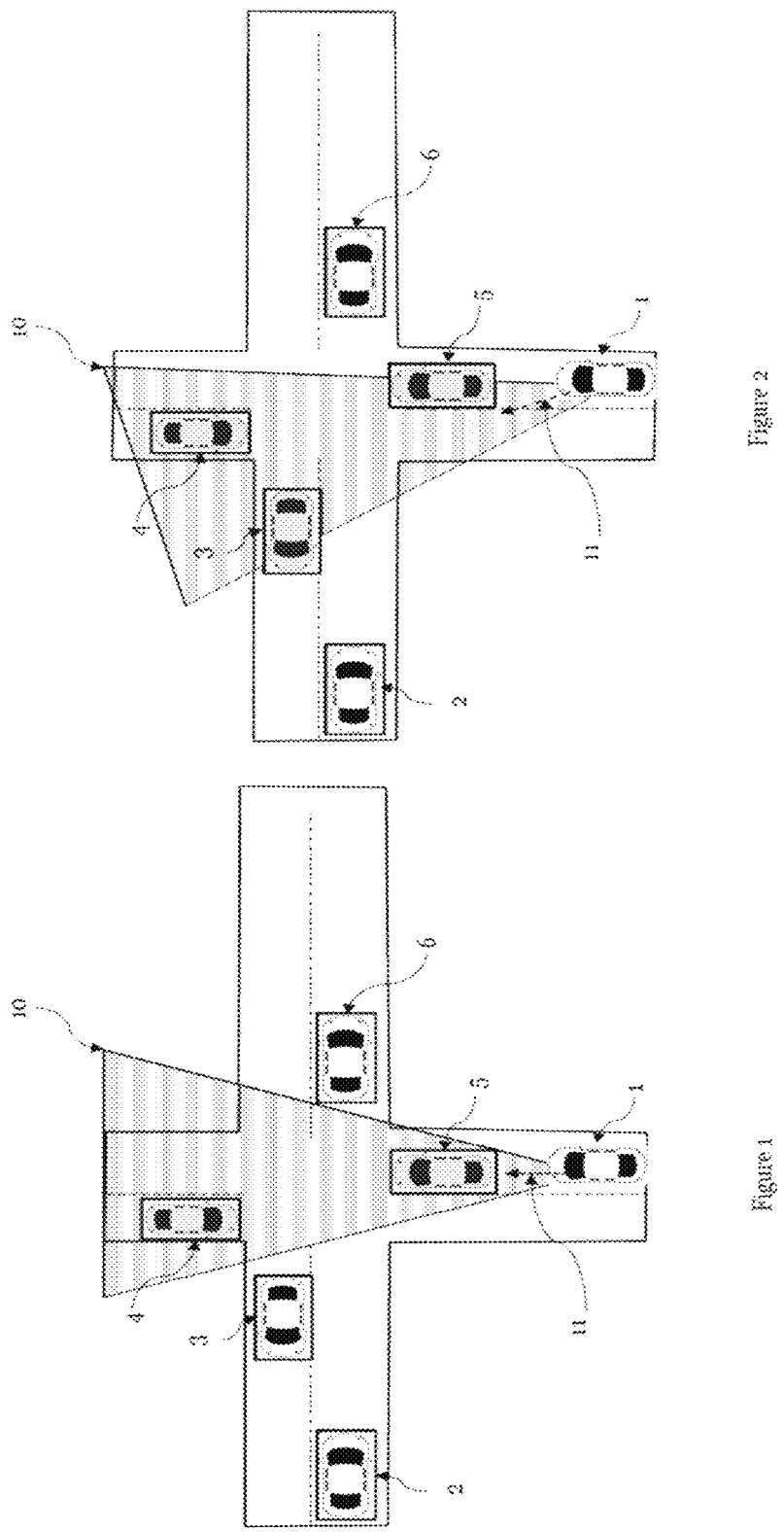
FIG. 1 shows an example implementation according to aspects of the invention where the driver is looking straight through the front windscreen.
FIG. 2 shows an example implementation according to aspects of the invention where the driver is looking slightly to the left through the front windscreen.

Monitoring techniques using driver input may have certain limitations. For instance, on the one hand, just because the driver is not inputting any controls to the vehicle, it does not necessarily mean that the driver is not aware of the current traffic situation. An example of such a situation would be when the driver does not provide any input because he is driving on a straight road that curves away from parked cars just in front of them. In this scenario, the lack of driver input by just going straight would result in a low driver awareness score, which in turn could cause the AEB system to trigger a false warning/braking intervention since it would seem like the driver is driving straight into the parked cars.

On the other hand, just because the driver is actively controlling the vehicle does not necessarily imply the driver is aware of the traffic situation. For example, when making a left turn and crossing a lane used by oncoming traffic, it might seem like the driver is aware of the traffic situation when using traditional driver monitoring techniques. In this scenario, the driver might not have spotted a fast-approaching, oncoming vehicle, while making the left turn. However, since the driver awareness would be high because of the active steering, the AEB function would trigger later since it will assume that the driver is aware of the traffic situation.

In order to improve the assistance provided to the driver, the present invention uses information about the presence of objects around the vehicle and information about where the driver has seen them. Combining this information makes it possible to determine which objects the driver has seen or has not seen.

In the following, aspects of the present invention are described in more detail with reference to the figures.

Object Tracking System

In order to detect the presence of objects around the vehicle, the vehicle is fitted with an object tracking system. The tracking system may be any one of radar, LiDAR, camera, or other sensors, or a combination thereof.

The tracking system is positioned at appropriate positions to enable detecting the presence of objects around the vehicle. The tracking system is positioned such that it is possible to perceive objects at least 180° in front of the vehicle, 180° in front and also in the back of the vehicle, or 270° in front of the vehicle, or 360° around the vehicle.

The tracking system can repeatedly detect the objects' position with respect to the vehicle. Additionally, it can also determine the movement of the objects around the vehicle and thereby the velocity and acceleration of the object compared to the previous position.

Driver Monitoring Camera

In order to determine what the driver has seen, the vehicle is provided with a driver monitoring camera to detect the gaze of the driver. The driver monitoring camera is positioned such that it takes an image of the driver inside the vehicle, in a seated position. Furthermore, the camera images the head of the driver, including the orientation of the head and the eyes of the driver. The camera is configured to continually image the driver and provide the information required for continuously detecting the gaze of the driver.

Additionally, the vehicle's internal space is also mapped to determine the position of the side-view mirror or rear-view mirror.

Gaze Direction

Based on the image that was taken by the driver monitoring camera, the gaze direction of the driver can be determined.

The gaze direction is the direction the driver is looking, which is the line-of-sight of the driver. In order to determine the gaze direction, the orientation of the head is detected. Additionally, the position of the iris of at least one of the eyes of the driver is detected.

Field of View

The field of view is the area which is visible to the driver. This may also include the peripheral view of the driver. In the various embodiment, the field of view is determined based on the gaze direction of the driver.

Such the gaze of the driver can be obtained from imaging the driver, as explained above.

In a further embodiment, additionally, the visibility of the driver is determined to identify the distance which is visible to the driver. This includes detecting the visibility conditions of the surroundings, such as the light level and the atmospheric conditions. Such visibility conditions may be detected by light sensors or other external cameras.

In a further embodiment, it is determined if the driver's gaze direction is on a secondary object, such as a side-view mirror or the rear-view mirror or a display screen. This indicates if the driver is looking at the vehicle's side or rear. In such a case, the gaze direction is updated to either the vehicle's side or the vehicle's rear, based on which object the driver is looking at. Furthermore, the visibility direction is updated based on the viewing angle of the side-view mirrors or the rear-view mirror or a display screen.

Now the invention will be explained based on the following embodiment shown in FIG. 1. As seen in the figure, vehicle 1, according to the invention, is on the road and is provided with the tracking system and the driver monitoring camera.

The tracking system has detected five objects, vehicles 2 to 6, on the road around the vehicle.

In the first example implementation, according to the invention shown in FIG. 1, the driver is looking straight through the front windscreen. Accordingly, the gaze direction 11 is determined as being straight. Subsequently, field of view 10 is determined based on the line-of-sight of the gaze direction, and in particular, on either side of the gaze direction based on the driver's viewing angle. The field of view is shown here as the shaded area.

As seen in the figure, the tracking system detected five additional objects (cars) on the road. However, only two objects 4 and 5 are within the field of view, and three objects 2, 3 and 6 are outside the field of view.

Therefore, the driver has not seen objects 2, 3 and 6, which are outside the field of view, and objects 4 and 5 which were within the field of view, were seen by the driver.

In a second example implementation according to the invention shown in FIG. 2, the driver is looking slightly to the left through the front windscreen. Accordingly, the gaze direction is determined as being slightly towards the left side of the vehicle, and subsequently, the field of view is also determined as being towards the left side of the vehicle, as shown in the figures.

As seen in the figure, objects 3, 4 and 5 are inside (at least partly) the field of view, and objects 2 and 6 are outside field of view and not seen by the driver.

Figure 3:
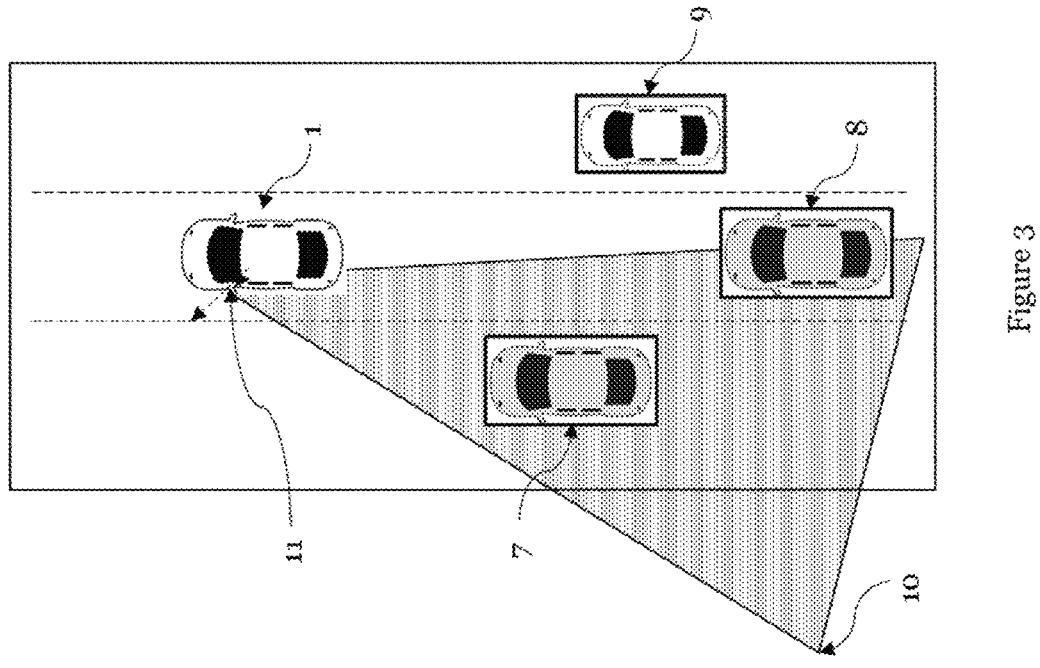
FIG. 3 shows an example implementation according to aspects of the invention where the driver is looking at the left side view mirror of the vehicle.

In a third example implementation according to the invention shown in FIG. 3, the driver is looking slightly to the left, but it is detected that the driver is looking at a secondary object, in this case, the left side view mirror.

Accordingly, the gaze direction is determined as being towards the rear left side of the vehicle, and subsequently, the field of view is also determined as being towards the rear left side of the vehicle in line with the side view mirror, as shown in the figures.

As seen in the figure, objects 7 and 8 are (at least partly) inside the field of view 10 of the driver, and object 9 is outside the field of view 10, and not seen by the driver.

Figure 4:
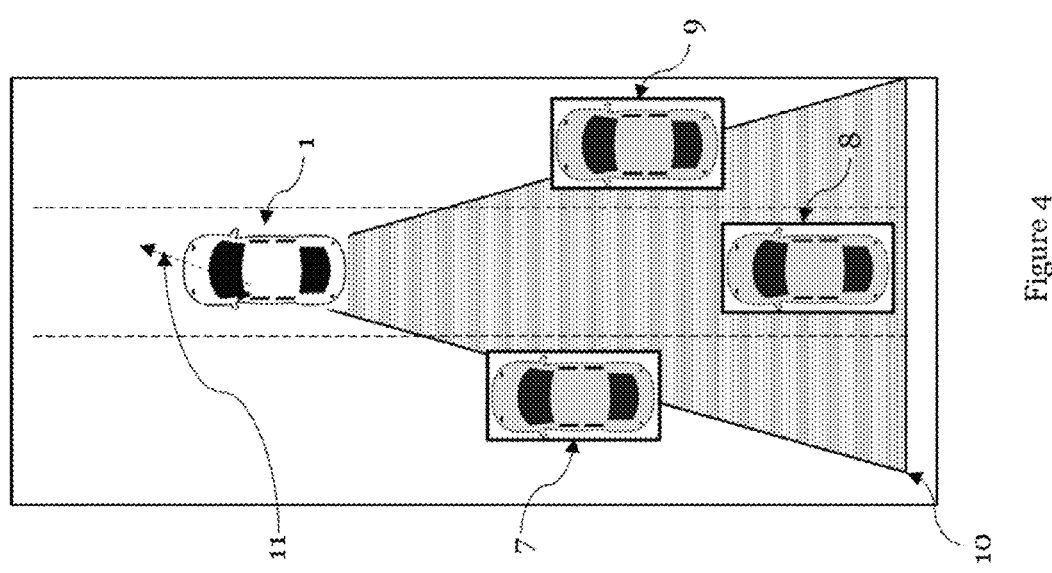
FIG. 4 shows an example implementation according to aspects of the invention where the driver is looking at the rear-view mirror of the vehicle.

In a fourth example implementation, according to the invention shown in FIG. 4, the driver is looking straight, but it is detected that the driver is looking slightly to the top, thus at a secondary object, in this case, the rear-view mirror.

Accordingly, the gaze direction is determined as being towards the rear of the vehicle, and subsequently, the field of view is also determined as being towards the rear of the vehicle in line with the rear-view mirror, as shown in the figures. A display screen which displays an image captured by a camera can be provided instead, or in addition to the rear-view or the side view mirror. Such a display screen may be placed in any suitable area visible to the driver and provide a field of view to the user based on the image capturing direction of the camera.

As seen in the figure, objects 7, 8 and 9 are (at least partly) inside the field of view of the driver.

Now the method of providing assistance to the driver based on the determination of the field of view is explained.

Method for Assisting a Driver

Figure 5:
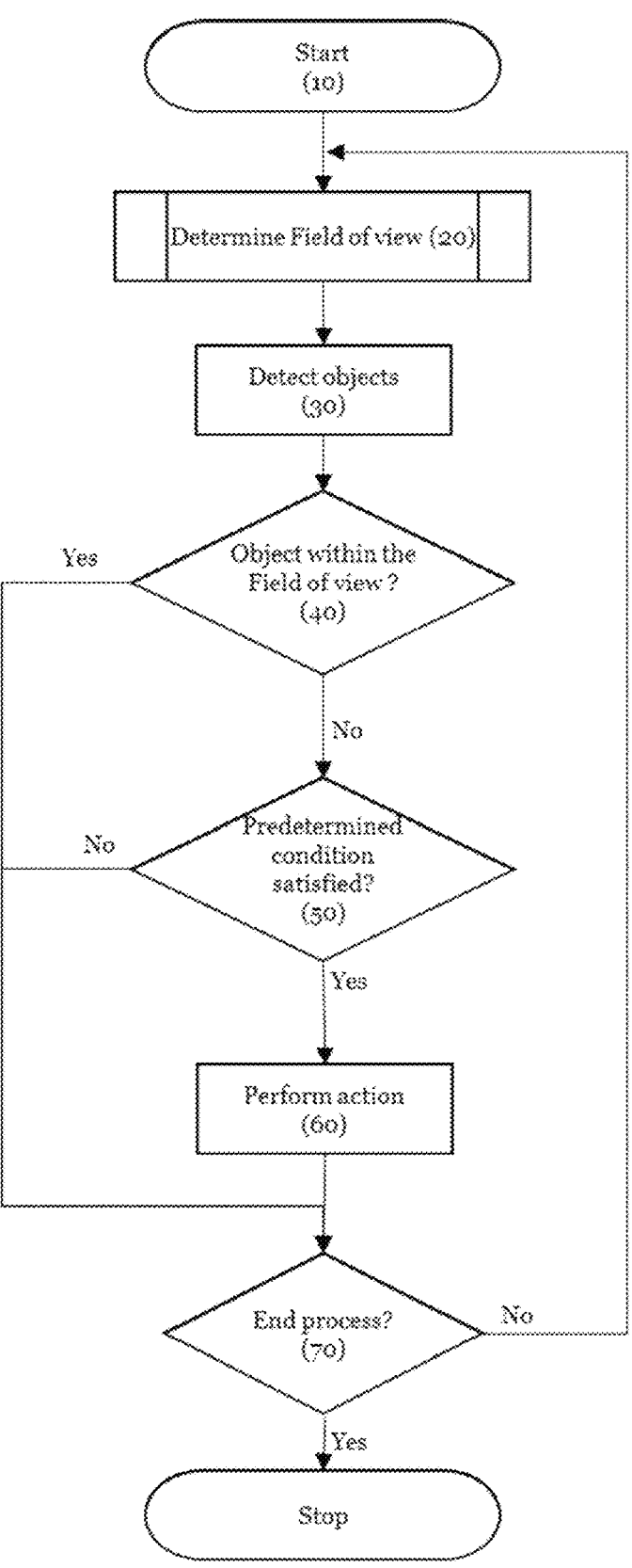
FIG. 5 shows a flowchart of the example implementation of the method of assisting the driver of the vehicle according to aspects of the invention.

FIG. 5 is a flowchart with the method of providing assistance steps according to the present invention for providing assistance.

The process is started in step 10. Next, the field of view is determined based on the gaze direction in step 20. The process of determining the field of view is explained in detail in the method described in FIG. 6, which will be described later.

Next, the objects around the vehicle are determined in step 30.

Based on the information of the field of view and the object information from the tracking system, it is determined if any of the detected objects are within the field of view in step 40 and if any of the detected objects are outside the field of view.

For instance, in the example of FIG. 1, the embodiment when the driver is looking straight through the front windscreen, it was determined that only two objects 4 and 5 are within the field of view, and three objects 2, 3 and 6 are outside the field of view.

If it is determined that one or more objects are detected to be outside the visible area (No in step 40), it is further checked if a predetermined condition is satisfied (step 50), such as to perform an action.

The predetermined conditions may be set according to the appropriate situation and the requirement which are considered for safe driving and avoiding or mitigating conditions.

For instance, if the detected object is determined as not within the field of view, it is assumed that the driver is not aware of the object. Therefore, if such an object outside the field of view is determined to be close to the vehicle, it may be considered a high-priority event and leading to an imminent collision.

In such a situation, a trigger is provided for an action to be performed in step 60.

The action depends on the system being used to assist the driver. For instance, in the case of the automatic braking system, the action provided may be a compensation measure, such as changing the triggering of the braking system earlier than usual. Other measures, such as an audio and/or visual warning, can be provided earlier, ensuring the driver is prompted to become aware of the object and providing adequate time to take mitigating actions.

By triggering earlier, the total warning and brake time can be increased, mitigating or completely avoiding collisions which could otherwise have happened. Therefore, by triggering actions and providing an assistance system based on the visibility of the driver, it is possible to provide an improved and accurate determination of true positives, thus improving the assistance system.

If it is determined that one or more objects detected are within the visible area (Yes in step 40), the process moves to step 70 and either repeat the process without performing an action or ends the process.

For instance, in the example of FIG. 1, it was determined that objects 4 and 5 are within the field of view, and it is determined that the driver is aware of the object. Therefore, by avoiding actions in such a case, false positive triggering can be reduced, which would otherwise be a nuisance for the driver.

Method for Determining the Field of View

Now the method of determining the field of view of step 20 according to the invention is described in detail below with reference to FIG. 6.

The image of the driver is obtained in step 201 from the driver monitoring camera. As explained earlier, the image is taken such that the driver's head and eyes are imaged.

From the image, the gaze direction of the driver is determined in step 220.

Figure 7:
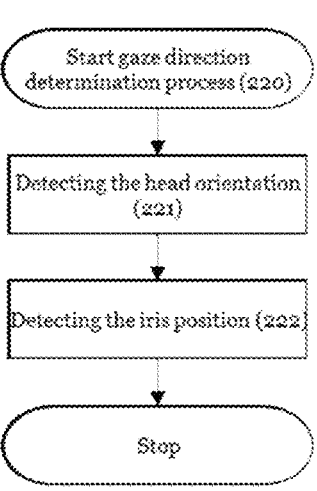
FIG. 7 shows a flowchart of the example implementation of the method of determining the gaze direction according to aspects of the invention.

The method of gaze direction determination is explained with reference to FIG. 7.

In particular, the camera is positioned such that it takes an image of the driver inside the vehicle, in a seated position. From the image, the head orientation of the driver is detected in step 221. Next, the iris position of at least one of the eyes of the driver is detected in step 222.

Based on the information of the orientation of the head and the iris position, it is possible to determine the driver's gaze direction. As it can be understood, it is possible to determine the gaze direction based on one or more of the above detections, and it not necessary to perform all the detections. For instance, the determination can be performed merely by detecting the head orientation, or the iris position.

Figure 6:
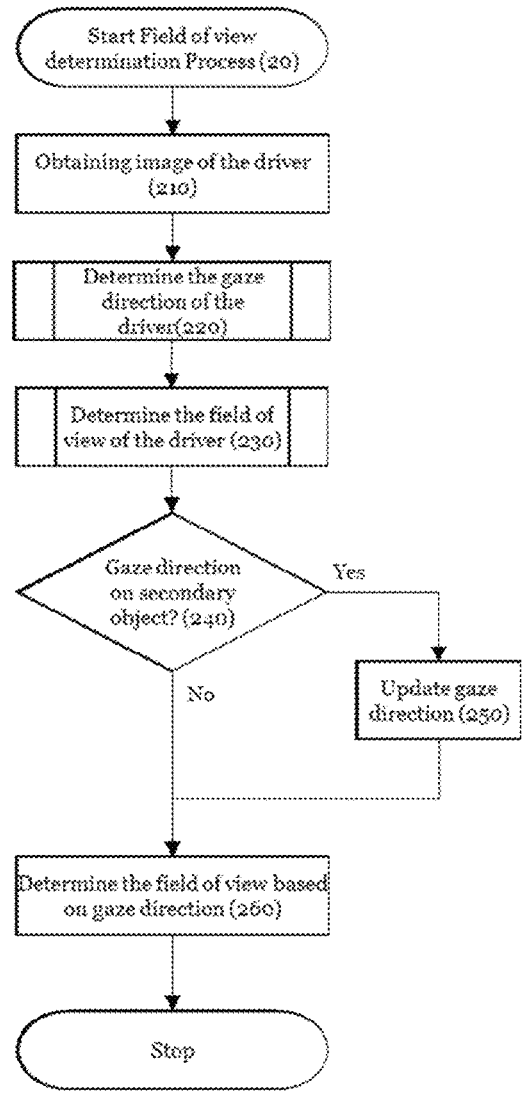
FIG. 6 shows a flowchart of the example implementation of the method of determining the field of view according to aspects of the invention.

Now coming back to FIG. 6, the visibility of the driver is detected in step 230.

Figure 8:
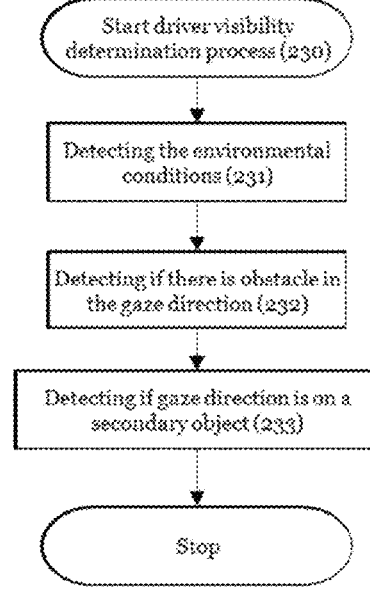
FIG. 8 shows a flowchart of the example implementation of the method of driver visibility determination according to aspects of the invention.

The method of driver visibility determination (step 230) is now explained in detail with reference to FIG. 8.

The visibility of the driver includes detecting the visibility conditions based as the environmental conditions, according to step 231, such as the light level and the atmospheric conditions. Additionally, it is determined if there is any obstacle in the gaze direction in step 232. In case of such an obstacle, the visibility distance and the field of view are appropriately corrected.

Additionally, it may be detected if the driver's gaze direction is on a secondary object in step 233, such as a side-view mirror or the rear-view mirror. This indicates if the driver is looking at the vehicle's side or rear.

As it can be understood, it is possible to determine the driver visibility based on one or more of the above detections, and it not necessary to perform all the detections. For instance, the determination can be performed merely by detecting if the gaze direction is on a secondary object, or if there is an obstacle, or the environmental conditions.

Now coming back to FIG. 6, based on the information of the secondary objects, it is now determined if the gaze direction is on a secondary object such as a side-view mirror or the rear-view mirror. In such a case, the gaze direction is updated in step 250 to be based on the gaze direction and the viewing angle of the secondary object.

Finally, the field of view is determined based on the gaze direction in step 260. The field of view extends along an angular range on either side of the line of sight determined by the gaze direction. The angular range is also determined to include a peripheral view of the driver.

Method for Assisting a Driver

Figure 9:
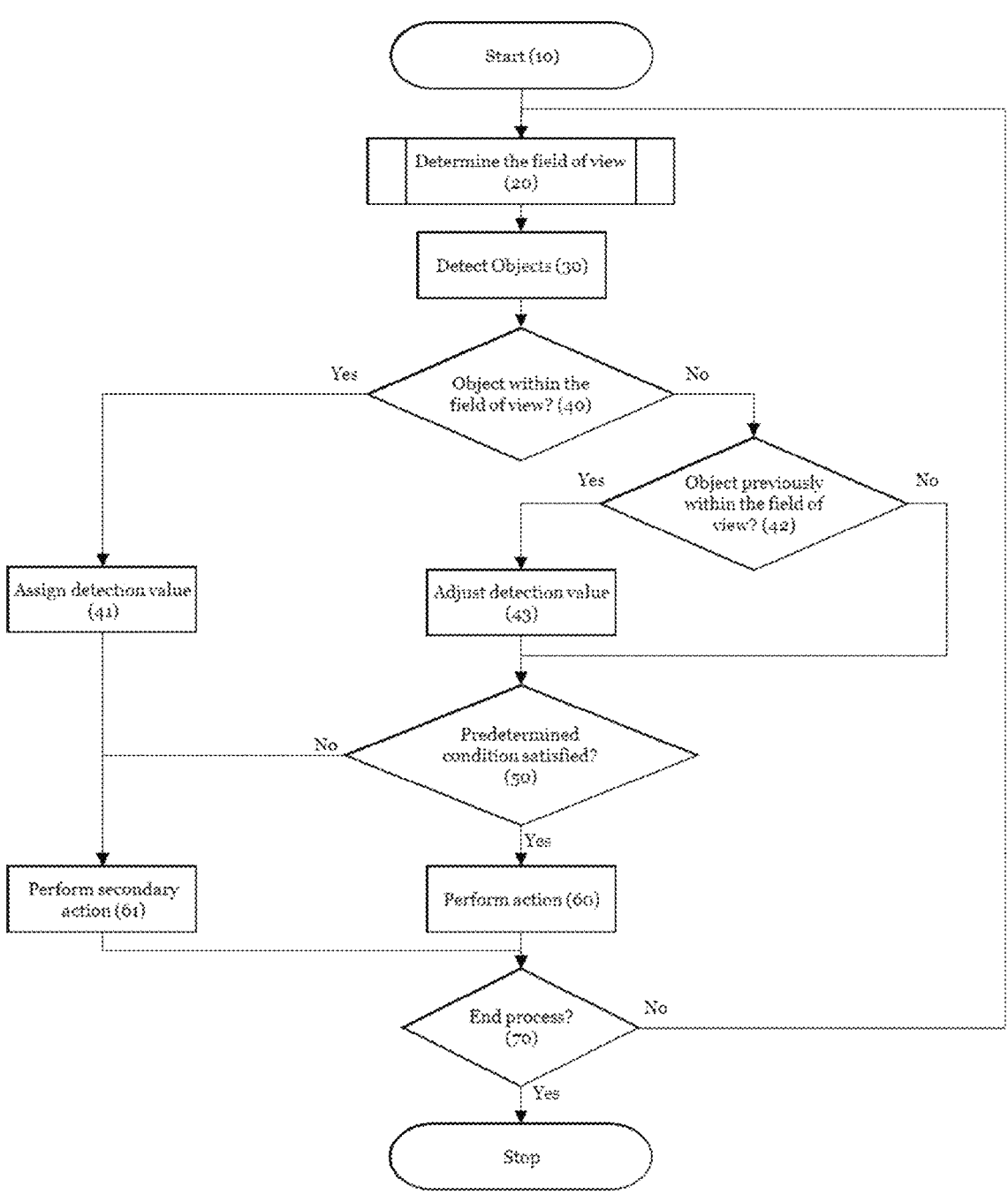
FIG. 9 shows a flowchart of the example implementation of the method of assisting the driver of the vehicle according to aspects of the invention.

Another embodiment of the invention relates to a method for assisting a driver of a vehicle, as described in FIG. 9.

The method is similar to the previous embodiment of FIG. 5 with some additional steps. Thus, the same numbering is included for the steps which are already described and similar to the previous embodiment.

Similar to the previous method, the process includes the determination of the field of view in step 20, detecting the objects in step 30, and determining if the object is in the field of view in step 40.

Additionally, when it is determined that one or more of the detected objects are inside the field of view of the driver (Yes in Step 40), a detection value is assigned in step 41, for each of the detected objects determined to be inside the field of view of the driver. The assigned value can then be stored such that it can be retrieved at a later stage.

The detection value is assigned to classify that the object was detected. It is further possible to use the detection value to indicate the priority or importance of the detected object. For instance, the detection value may be based on the position of the object with respect to the vehicle. This will set the priority of the detected object based on how close it is to the vehicle.

In another embodiment, or additionally, the detection value may be based on where the object was positioned inside the field of view. For instance, a detection value may be assigned based on if the object was in the outer range of the field of view, implying it was in the peripheral view of the field of view or in the center of the field of view, so the driver may have directly looked at the object. This will ensure that the object in the peripheral view is given a lower detection value, as the driver may have missed it. This avoids incorrect classification of the objects and avoids false positives by providing triggers based on such objects in the peripheral view.

Based on the detection value, a secondary action may be performed in step 61. For instance, if the object was detected as being in the center of the field of view, the detection value is high as it is considered very likely that the driver has seen the object. Therefore, a secondary action, such as adapting the triggering of the AEB system, can be delayed for such an object.

Therefore, it is possible to provide compensation measures, such as delaying the triggering point based on whether the driver is aware of the object. Therefore, false positive triggering can be reduced, which would otherwise be a nuisance for the driver.

It is determined if the process ends in step 70. In case the process is not ended, the process is repeated. In particular, the step of determining the field of view in step 20 is based on the driver's gaze direction and detecting if one or more objects are present around the vehicle in step 30.

Subsequently, the step of determining the field of view is repeated and if one or more objects are present around the vehicle. Subsequently, it is determined if any of the detected objects is within the field of view in step 40, and if any of the detected objects is outside the field of view.

Suppose any of the detected objects are detected as being outside the field of view, it is now determined in step 42, if these detected objects were previously detected as being within the previously determined field of view.

This is to assess how long it has been since the object was last detected as being within the field of view to determine when the driver was last aware of the object. In case it was not detected as being previously within the field of view (No in step 42), the process moves to step 50.

In case it was determined that the object was previously within the previously determined field of view (Yes in Step 42), the detection value which was previously assigned to the object during the previous detection is now adjusted to a new detection value in step 43. For instance, if the object was detected as previously in the field of view and now is no longer in the field of view, it means that the driver was previously aware of the object but is no longer visible to the driver. This can be performed by retrieving the detection value which was assigned in step 41, and adjusting the detection value. The adjusted detection value is then stored. Therefore, the detection value that was originally assigned is reduced, and the reduction depends on how long ago the object was last determined as being present in the field of view.

Now moving to step 50, it is determined if one or more objects that were now detected are outside the field of view (No in step 40). It is further checked if a predetermined condition is satisfied (step 50) so that an action may be performed.

As indicated earlier, the predetermined condition is set according to the appropriate situation and the requirements which are considered for safe driving and avoiding mitigating conditions.

In addition to the previously indicated predetermined conditions (position of the object to the vehicle), further conditions may be provided.

In the present embodiment, an action may be performed if the detection value, after adjusting, is below a certain threshold. That is, if it was determined that the detected object was previously within the field of view, the driver might be aware of the object. However, the longer it has been since the object was within the field of view, the more likely it is that the driver is no longer aware of the object.

Therefore, if the object was within the field of view at a previous time but has not been within the field of view now for some time, the detection value can be adjusted in each cycle of detection when required, thus reducing the detection value over time. Once the detection value falls below a certain threshold, it is no longer classified as aware to the driver. Therefore, action, such as alerting and/or providing a compensation measure, may be performed in order to ensure safe driving and mitigating conditions.

By providing a threshold, it is possible to provide an optimal time to take action, by providing a balance between taking an action too early, or too late.

That is, it ensures that action is not taken too early (i.e., too soon after the object was detected within the field of view) so as to annoy the driver or provide false negatives. At the same time, action is not taken too late by relying on old information (i.e., too long after the object was last detected as being within the field of view), thus not compromising on safety.

In a further embodiment, or additionally, the predetermined condition when an action is taken may be based on the change in the position of the object compared to the previous position.

Since it is possible to track the objects and determine their position repeatedly, it can be determined if the object not within the field of view has now changed its position. Based on the change in the position, it would be necessary to trigger the action. For instance, if it is determined that the object, which was earlier determined as within the field of view and thus aware to the driver, is now at a position which may be of higher priority or may lead to a dangerous situation, an action, such as to alert and/or providing a compensation measure may be performed to avoid such situation.

Additionally, the predetermined situation may be when an action may be taken based on a rate of change in the position of a detected object compared to its previous positions. Since the tracking process is repeatedly performed, it is also possible to detect if the acceleration or speed of the object had changed compared to when the object was last detected as being within the field of view and, thus, when the driver was last aware of it.

This ensures that the conditions, such as unexpected behavior of the object compared to what was expected based on the instance when it was last detected in the field of view, can be captured and suitable mitigating circumstances provided.

For instance, the driver, aware of a detected object which was travelling at 50 kph when it was last detected within the field of view, expects the object to overtake at a certain time. However, suppose the previously detected object accelerates or speeds up significantly. In that case, the previous assumption of the driver based on the previous awareness is no longer correct as the object may be relatively closer to the vehicle earlier than expected. In such a case, an action such as an alert and/or other compensation measures may be provided earlier than in other cases.

This provides a robust and dynamic adaptation for assisting the driver based on the change in the other object.

With the present invention, it is possible to provide an improved driver assistance method.

The invention also provides a driver assistance system having suitable processing device which can perform the method described above.

In particular, the method may be implemented in terms of a computer program which may be executed on any suitable data processing device comprising means (e.g., a memory and one or more processors operatively coupled to the memory) being configured accordingly. The computer program may be stored as computer-executable instructions on a non-transitory computer-readable medium.

Embodiments of the present disclosure may be realized in any of various forms. For example, in some embodiments, the present invention may be realized as a computer-implemented method, a computer-readable memory medium, or a computer system.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

The driver assistance system is provided in a vehicle, such as automobiles, robots, etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. In particular, with reference to the appended claims, features from dependent claims may be combined with those of the independent claims and features from respective independent claims may be combined in any appropriate manner and not merely in the specific combinations enumerated in the appended claims.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A computer-implemented method for assisting a driver of a vehicle, the computer-implemented method comprising:
   determining, based on a gaze direction of the driver, a field of view of the driver;
   detecting, using an object tracking system, that one or more objects are present around the vehicle;
   determining whether an object of the detected objects is:
   at least partly inside the field of view, or
   outside the field of view;
   in response to a determination that the object is at least partly inside the field of view, assigning a detection value to the object;
   in response to a determination that the object has met a first set of criteria, adjusting the detection value of the object, wherein the first set of criteria includes:
   the object is outside the field of view, and
   the object was previously determined to be at least partly within the field of view; and
   performing an action in response a determination that a second set of criteria has been met, wherein the second set of criteria includes:
   the object is outside of the field of view; and
   the object has a detection value below a predefined threshold.

2. The computer-implemented method of claim 1 wherein performing the action includes providing at least one of an alert or a compensation measure based on a predetermined condition.

3. The computer-implemented method of claim 2 further comprising:
   storing a respective detection value of each of the detected objects.

4. The computer-implemented method of claim 3 wherein the respective detection value is based on at least one of:
   a position of the detected object in relation to the vehicle, or
   the position of the detected object within the field of view.

5. The computer-implemented method of claim 3 further comprising:
   retrieving the respective detected value of each of the detected objects;
   determining a visibility area based on the gaze direction of the driver, and that one or more objects are present around the vehicle;
   determining that a detected object outside the visibility area was previously detected as being within the visibility area; and
   adjusting the detection value for each of the determined objects.

6. The computer-implemented method of claim 3 wherein the predetermined condition is based on at least one of:
   a position of a detected object in relation to the vehicle,
   the detection value of a detected object being less than a threshold value,
   a change in the position of a detected object compared to its previous position, or
   a rate of change in the position of a detected object compared to its previous positions.

7. The computer-implemented method of claim 3 wherein performing the action includes adapting a trigger condition for activating an Automatic Emergency Breaking (AEB) system based on the detection value of a detected object.

8. The computer-implemented method of claim 1 wherein the gaze direction of the driver is detected based on an image of the driver captured by a driver monitoring camera.

9. The computer-implemented method of claim 1 wherein detecting the gaze direction includes at least one of:

determining an orientation of a head of the driver, or
    determining a position of at least one iris of the driver.

10. The computer-implemented method of claim 1 wherein the field of view is obtained based on one or more parameters of:

the gaze direction of the driver,
    a presence of one of a side view mirror, a rear view mirror, or a display screen in the gaze direction, and
    environmental conditions.

11. The computer-implemented method of claim 1 wherein:

the object tracking system includes at least one of:
        a radar,
        a LiDAR, or
        a camera; and
    the radar, the LiDAR, or the camera are positioned at predetermined positions on the vehicle to enable detecting a presence of one or more objects around the vehicle.

12. A driver monitoring system for a vehicle comprising:

memory configured to store instructions; and
    at least one processor configured to execute the instructions, wherein the instructions include:
        determining, based on a gaze direction of a driver, a field of view of the driver;
        detecting, using an object tracking system, that one or more objects are present around the vehicle;
        determining whether an object of the detected objects is:
            at least partly inside the field of view; or
            outside the field of view;
        in response to a determination that the object is at least partly inside the field of view, assigning a detection value to the object;
        in response to a determination that the object has met a first set of criteria, adjusting the detection value of the object, wherein the first set of criteria includes:

the object is outside the field of view, and
    the object was previously determined to be at least partly within the field of view; and
    performing an action in response to a determination that a second set of criteria has been met, wherein the second set of criteria includes:
        the object is outside of the field of view; and
        the object has detection value below a predefined threshold.

13. The driver monitoring system of claim 12 further comprising at least one of:

a driver monitoring camera configured to capture an image of the driver; or
    an object tracking system configured to detect a presence of one or more objects around the vehicle.

14. A vehicle comprising:

the driver monitoring system of claim 12.

15. A non-transitory computer-readable medium comprising instructions including:

determining, based on a gaze direction of a driver, a field of view;
    detecting, using an object tracking system, that one or more objects are present around a vehicle;
    determining whether an object of the detected objects is:
        at least partly inside the field of view, or
        outside the field of view;
    in response to a determination that the object is at least partly inside the field of view, assigning a detection value to the object;
    in response to a determination that the object has met a first set of criteria, adjusting the detection value of the object, wherein the first set of criteria includes:
        the object is outside the field of view, and
        the object was previously determined to be at least partly within the field of view; and
    performing an action in response to a determination that a second set of criteria has been met, wherein the second set of criteria includes:
        the object is outside of the field of view; and
        the object has a detection value below a predefined threshold.

* * * * *